March 29, 1966 L. R. ULLERY, JR 3,243,661

ENHANCED MICRO-MODULES

Filed June 25, 1963 3 Sheets-Sheet 1

INVENTOR
LEE R. ULLERY JR.
BY [signature]
ATTORNEY

March 29, 1966 L. R. ULLERY, JR 3,243,661

ENHANCED MICRO-MODULES

Filed June 25, 1963 3 Sheets-Sheet 2

INVENTOR
LEE R. ULLERY JR.
BY [signature]
ATTORNEY

March 29, 1966 L. R. ULLERY, JR 3,243,661

ENHANCED MICRO-MODULES

Filed June 25, 1963 3 Sheets-Sheet 3

INVENTOR
LEE R. ULLERY JR.
BY [signature]
ATTORNEY

United States Patent Office 3,243,661

Patented Mar. 29, 1966

3,243,661
ENHANCED MICRO-MODULES

Lee R. Ullery, Jr., Simsbury, Conn., assignor to United Aircraft Corporation, East Hartford, Conn., a corporation of Delaware Filed June 25, 1963, Ser. No. 290,368
8 Claims. (Cl. 317—101)

This invention relates to microminiaturized electronic circuitry. More particularly, this invention is directed to a scheme for the modular packaging of electronic components which is compatible with all prior art approaches to microminiaturization. Thus, this invention relates to a novel microminiaturized electronic subassembly which will be hereinafter referred to as the enhanced micro-module.

One continuous and consistent trend in the history of electronics has been the reduction in the size and weight of the assembly needed for any particular electronic function. Coupled with the foregoing trend has been an ever increasing effort to increase reliability and decrease cost through standardization of modular packages and the techniques for assembling such packages. Many techniques for reducing the size, weight, and power consumption of electronic components, circuit assemblies, and functional units have been proposed, demonstrated and, occasionally, exploited. In some cases, for example cord wood assemblies, individual components retain their individualities and are interconnected by relatively standard, although sophisticated, wiring techniques. In certain of the more refined approaches, a number of recognizable devices are combined into an integrated structure in which the interconnecting structural medium between the devices contributes to the electrical properties of the circuit. The latter concept produces devices which are generally known as functional electronic blocks or crystal circuits. The functional electronic block or crystal circuit relies on the creation of many pn junctions on one slab of host semiconductor material coupled with the realization that semiconductor materials can be fashioned in such a way that other regions within the slab will yield capacitive and resistive effects. For a discussion of the fabrication of functional electronic blocks, reference may be made to copending application Serial No. 186,467, filed April 10, 1962, by myself and D. J. Caribotti as coinventors and assigned to the same assignee as this invention. Another existing approach to microminiaturization includes the use of specially shaped elements to facilitate denser circuit assemblies. Within this class of elements are the so-called "dot" components. A further area in which considerable progress has been made is the production of thin film circuitry and components.

While each of the foregoing approaches to microminiaturization, and other methods not mentioned, have desirable attributes, the cord wood assembly approach is the only prior art method which provides the necessary inter and intra connection flexibility. As should be obvious, the cord wood assemblies suffer from volumetric inefficiency and structural weakness. Inter and intra connection flexibility is necessary because none of the previous microminiaturization approaches can, standing alone, provide a complete variety of circuit elements as is necessary for the assembly to perform a complex electronic function. For example, considering the functional electronic block approach, some passive devices may not be fabricated within the elemental block. That is, it is now and probably will remain impossible to create precise temperature independent resistors, nonvoltage dependent capacitors, large capacitors required for analog circuitry, inductors, transformers, and storage devices within a chip of semiconductor material. Thus, in order to perform complex electronic functions, the functional electronic blocks must be used in conjunction with outside components. This same disadvantage, although in relation to different circuit devices, is inherent in the "dot" and thin film approaches.

Prior art attempts to integrate or incorporate together the aforementioned types of microminiaturized circuits and components have largely been limited to the utilization of printed circuit boards having the miniaturized components mounted thereon. This approach has in turn dictated a requirement that the functional electronic blocks and discrete pn junction devices be individually packaged. Packaging or encapsulation of junction devices is necessary since these devices are very susceptible to contamination of the junction areas at operating or high storage temperatures. Individual packaging is obviously costly from the standpoint of economics and also from the standpoint of volumetric efficiency since the encapsulating member is almost always many times greater in size than the junction device it contains. Also, the combination of an individually encapsulated device, which usually comprises the active device inserted in a block of polymeric material, and the printed circuit on which it is mounted will not provide adequate heat transfer away from the junction areas of the device for many applications. This lack of sufficient heat transfer capability precipitates another disadvantage inherent in prior art microminiaturized circuit packages. It is desirable to have all components in a circuit such as a D.C. amplifier operating at the same temperature so that operation of the circuit will be stable. With the junction devices individually packaged, achieving the same operating temperature at the various junction areas and also at the passive circuit components is virtually impossible. The foregoing deficiency inherent in prior art packaging techniques obviously also applies to bridge and divider networks wherein it is desirable if not mandatory to have all components at the same temperature.

As discussed above, previous packaging techniques have not utilized unencapsulated junction devices but rather have individually encapsulated these devices by known potting techniques. Potting was accomplished by inserting the elements into a polymeric environment. During potting as well as in operation at elevated temperature, the mechanical stresses asserted on the elements due to the tendency of the polymeric potting materials to flow is a potential cause of failure. Also, along with the heat transfer and volumetric efficiency problems mentioned above, polymeric encapsulation actually enhances undesirable coupling between elements and interconnecting paths, particularly at high frequencies, because of the relatively high dielectric constant of polymeric materials. That is, polymeric materials have an average dielectric constant of three while that of a vacuum, for example, is unity. Further, polymeric materials offer no shielding from electric fields and thus, in the past, the encapsulated junction devices had to be encapsulated a second time, although in a package with other elements, to provide R.F. shielding. A still further deficiency inherent in the use of polymeric encapsulation is that the materials used break down in the presence of nuclear radiation and create free radicals which can react with silicon and thus cause failure of encapsulated active devices. Even when there is not break down of the polymeric encapsulating medium, there is a tendency for contaminants to migrate through the medium to the junction areas of active devices. As is well known, such contaminants even in very small concentration, can cause degradation of active devices by shorting out of junctions. Due to their low melting point and poor heat transfer characteristics, potted devices become easily overheated and thus physically distorted if operated or stored in even moderately high temperature environments.

Referring again to the lack of flexibility in the prior art packaging techniques, a primary deficiency in prior art packages is that they generally do not have enough interconnecting members. This problem, symptomatic of the older techniques, resulted from an effort to make the packages as reliable as possible. The more individual components or circuits employed, the more complex the cross-over or multilayer network for interconnecting these individual components and circuits became. Similarly, as complexity and number of individual joints increased, the chance of failure under operating conditions increased. As will be discussed in more detail below, this is an extremely critical problem when soldering, the usual prior art joining technique, is employed. The resultant complexity of the interconnection networks previously used, when the electronic subassembly was intended to perform a function necessitating use of a large number of individual components, resulted from the fact that prior art packages were expandable only in two dimensions. Thus, use of printed circuit techniques restricted prior art interconnection networks to paths in a single plane. These paths are of necessity relatively long and thus further limit the high frequency response or speed of operation of the overall assembly.

Along with the deficiencies mentioned above, prior art miniaturization techniques suffered from an inability to pre-test individual devices prior to assembly. It would be a decided advantage to provide for pre-testing of basic assembly elements prior to integration into a package. This would increase reliability since if the circuit designer has at his disposal information concerning the behaviour of all available elements under all conditions, he may select components with the narrowest of tolerances for the particular function and operating environment under consideration. In the case of elements inserted into polymeric environments, this was often impossible since the operation of the divices may vary before and after encapsulation and also may vary in accordance with the elements with which it is associated in the final assembly. If a low dew-point environment could be provided after bake out for testing purposes, and the package was filled with this same environment after all interconnections were made, the test and service environments would be essentially the same and the operation of the devices could be predicted. Also, in the area of circuit design, most circuit organization is accomplished on a cut and try basis. The principal element of uncertainty which goes into circuit design is the utilization of lumped constant parameters. These parameters are then adversely affected by the lay out or organization of the circuit. If pre-tested components were to be utilized in a standard modular package, conceivably computer organization of the circuits would become more practical. However, to accomplish the foregoing, there must obviously be flexibility in choice of components and, in order to permit interconnection and packaging, the components must be mounted on a standard size and type substrate and all should be operated at the same temperature and in the same environment.

Probably the most difficult problem from the standpoint of both reliability and automation of assembly that has hampered the prior art packaging techniques centered around interconnecting or joining the various circuit components to each other and to circuit boards. In the past, interconnection failures have been high. This is largely due to the joining technique used which was generally soldering. Due to the inherent possibility of cold solder joints, soldering has long been suspect as an extremely unreliable process. Also, soldering usually causes the addition of unwanted fluxes to the assembly which in turn may cause contamination of junction devices. Further, with the exception of dip soldering, assembling a micro-module by soldering is a technique not susceptible to automation. Dip soldering is inacceptable today due to the limitation it places on component density. That is, dip soldering has an inherent disadvantage in that leads cannot be closely spaced if the solder is to drain off between terminals. As should be obvious, to be economically practical for everyday use, a modular electronic package must be assembled in an automated manner.

This invention overcomes these and other disadvantages of the prior art by providing an enhanced micro-module which incorporates the desirable features of the prior art approaches to microminiaturization.

It is therefore an object of this invention to provide an enhanced micro-module.

It is another object of this invention to provide an electronic subassembly having high volumetric efficiency.

It is also an object of this invention to provide a modular dimensioned packaging system for electronic devices and components.

It is a further object of this invention to provide a modular dimensioned electronic package amenable to computer organization.

It is another object of this invention to provide a modular electronic package in which there is improved isolation between components and from outside sources of interference.

It is also an object of this invention to provide a microminiaturized electronic subassembly in which there is improved radiation shielding for active devices.

It is still another object of this invention to provide a means for hermetically sealing a modular electronic package.

It is yet another object of this invention to provide a modular electronic package which may be operated in either a gaseous or evacuated environment.

It is also an object of this invention to provide a microminiaturized electronic subassembly having superior heat transfer characteristics.

It is yet another object of this invention to provide a microminiaturized electronic subassembly which may utilize uncased junction devices.

It is a further object of this invention to provide an improved modular package for electronic components, devices and circuits and an automated assembly process therefor.

It is still another object of this invention to provide improved modular electronic assemblies without limiting electrical design freedom.

These and other objects of this invention are realized through an all welded, hermetically sealed, interconnection-packaging system which is compatible with all prior art approaches to microminiaturization. By joining components through welds made with a highly energized beam, this system provides extremely high conductor and termination densities of superior reliability. The structure of the enhanced micro-module relies on the formation of integrated as well as hybrid semiconductor and thin film circuits on standard ceramic or supercooled liquid wafers. These substrate wafers are then stacked, interconnected by welded conductors and placed in a hermetically sealed enclosure. Employment of substrates having good heat transfer characteristics coupled with hermeticity and freedom from polymers makes the system compatible with extreme environments and enables the use of uncased discrete active devices and semiconductor circuits. Use of standard size wafer as structural parts permits the establishment of an automated assembly process without limiting electrical design freedom.

This invention may be better understood and its numerous advantages will become apparent to those skilled in the art by reference to the accompanying drawing wherein like reference numerals apply to like elements in the various figures and in which.

The basic elements of the enhanced micro-module are the substrates, hereinafter referred to as the microwafers, which may be either ceramic, such as alumina or beryllia, or supercooled liquid, such as glass. For many uses the ceramics are to be preferred since these materials have superior heat transfer characteristics, they are light weight, they are insulators, and since they are structurally strong. The microwafers are typically .31 x .31 inch on a side and .01 or .02 inch thick.

*Formation of microwafers*

Figure 1:
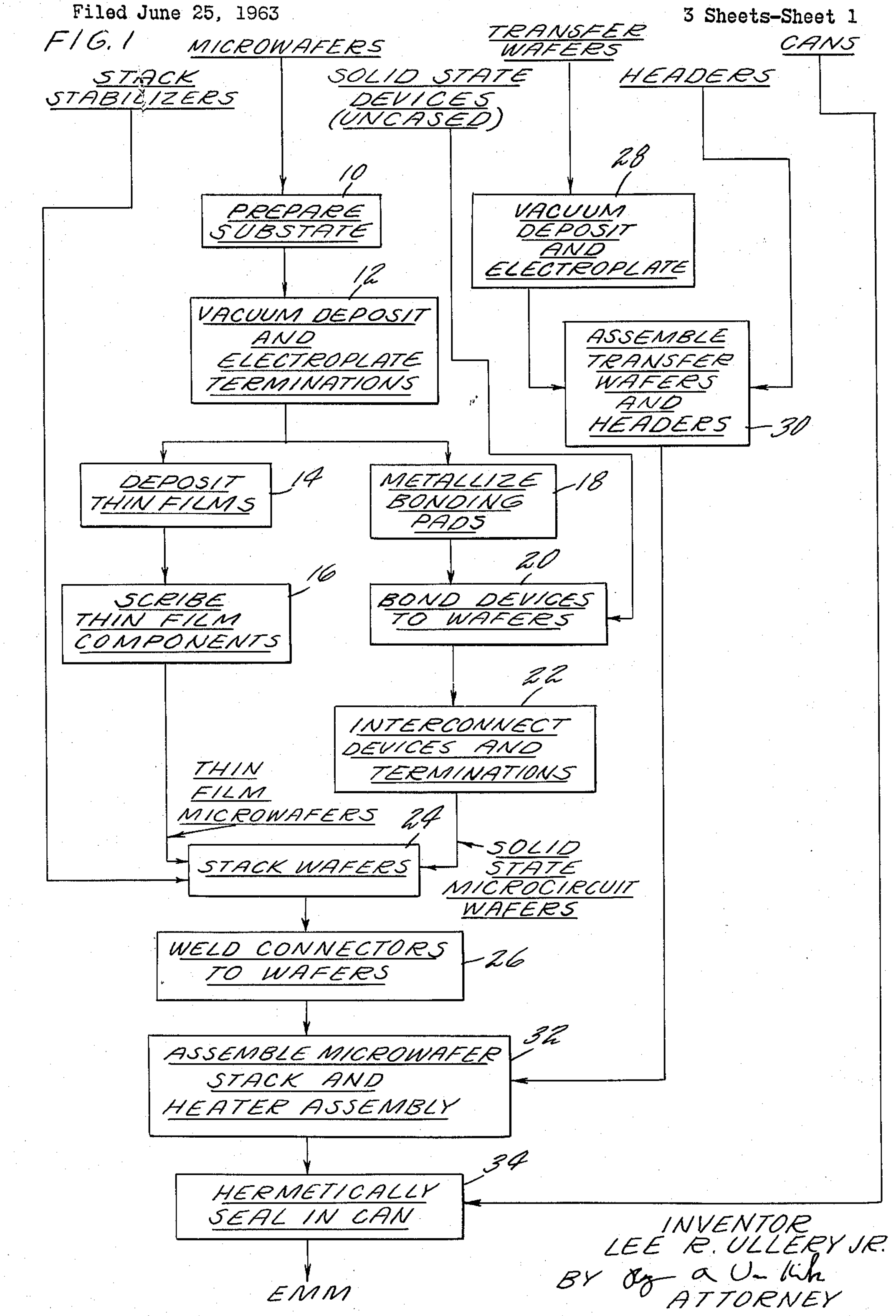
FIGURE 1 is a flow-process chart depicting the various steps in the assembly of the enhanced micro-module which comprises this invention.

Referring now to FIGURE 1, after incoming inspection directed to soundness, surface roughness, and tolerances, the microwafers are loaded into holders for preparation step 10 which includes cleaning and drying. Cleaning the microwafers is accomplished by first washing with a degreasing solvent such as trichloroethylene. Next the wafers are washed with a detergent in an ultrasonic bath to remove any film left by the degreasing solvent. Finally, the wafers are exposed to a Freon rinse to remove any remaining dust particles. After cleaning, the wafers are placed in a fixture which is in turn positioned in a vacuum deposition apparatus. The purpose of vacuum deposition step 12 is to form edge terminations on the microwafers thereby permitting communication between the active and passive components which will later be affixed to the surface of the microwafers and the conductor ribbons which will interconnect a plurality of stacked wafers. The edge terminations are formed, in a manner well known in the art, by the vacuum deposition of chromium and gold on discrete sections of the edge and face surfaces of the wafers. Definition of the vacuum deposit on all four edges of the wafers is achieved by means of comb-like masks which are placed in contact with the edges of the wafers. Corresponding discrete paths on the surfaces of the wafers, which discrete paths will intercept respective edge deposits, are obtained by means of spacer masks which are inserted between the microwafers in the wafer holding fixture. The wafer holding fixture is designed to hold the substrate at the corners. A fixture of this type is shown in application Serial No. 272,140, filed April 10, 1963 by James E. Taylor and assigned to the same assignee as this invention. As mentioned above, the terminations are formed by the deposition of chromium and gold. The chromium is vacuum deposited first since it affords a tenacious bond with the wafer material. The gold coating is then deposited over the chromium to minimize pad resistance. The thickness of the coating of chromium and gold is about 200 and 1000–10,000 angstroms respectively. In order to insure that terminations will be deposited on all four edges of the wafers in a single step, the wafer fixtures are positioned in a "ferris wheel" like device which is mounted in the vacuum deposition apparatus. In operation, while the "ferris wheel" is revolving, the wafer holding fixture also rotates about its own axis. Thus, all four edges of the wafers are impinged upon by the evaporant flux emanating from two sources located outside the ferris wheel and below its axis. According to standard practice, the substrates are outgassed at 350° C. for approximately one-half hour after a pressure of $10^{-5}$ Torr has been reached. Deposition of the chromium and gold follows at approximately 300° C. After cooling to room temperature, the microwafers are re-masked so that only the small picture-frame strip around their periphery is covered. When a pressure of approximately $10^{-5}$ Torr is reached, aluminum is deposited on the exposed face surfaces of the microwafers. The aluminum area film is deposited to interconnect or short-out all the terminations for electroplating. The microwafers are next removed from the vacuum deposition apparatus and are loaded in an electroplating fixture which is placed in an anodizing bath to promote build-up of an oxide coating on the vacuum deposited aluminum interconnecting film. Due to the oxide coating, the aluminum film will not be electroplated during the next operation. The fixture with the anodized wafers is subsequently rinsed off, electrical contact is made with the aluminum interconnecting film by breaking through the oxide coating, and the wafers are placed in an electroplating apparatus wherein the discrete terminations are electroplated with nickel or copper to an overall thickness of .0005"–.002" inch. The purpose of the layer of nickel or copper, which will only be deposited on the unanodized and metallized portions of the wafers, is to provide a surface to which interconnecting ribbons may be readily welded. That is, pads which leads may be welded to are built up on the edges of the wafers by the electroplating process thereby promoting reliability since the thicker the pad the easier it is to weld because there is more material for forming an alloy bond with the leads. After electroplating, the fixtures are immersed in an NaOH solution wherein the aluminum dissolves and a plurality of terminated microwafers are produced. That is, the NaOH will not take off the gold and chromium nor will it attack aluminum oxide. Rather, the NaOH reacts with the aluminum under the oxide which then peels off taking the oxide with it. In the foregoing manner, .014 inch wide terminations will typically be formed spaced on 25 mil centers on all four edges of the microcircuit wafers. It should be noted that the above-described method is particularly adapted to the formation of tapered terminations. Tapered terminations are often desirable for connection to thin film components without the points of high resistance or "hot spots" associated with conventional terminations.

*Formation of thin film microwafers*

After the terminations have been formed, the microwafers may be used as the base for either thin film microwafers, solid state microcircuit wafers or combination thin film-solid state microwafers. If thin film microwafers are to be produced, an additional coating or coatings are required. That is, after deposition and electroplating of the terminations, the wafers are again loaded into fixtures and placed, with their face surfaces exposed to the flux, in a vacuum deposition apparatus. The step 14 of vacuum deposition of thin films on one or both surfaces of the microwafers may, dependent upon the thin film passive device to be formed, take two approaches. The approach to be followed is determined by whether it is desired to form, on the one hand, thin film resistors and inductors or, on the other hand, thin film capacitors. In practice, resistors and capacitors may be formed on the same microwafer, but on opposite surfaces with or without active components, and resistors and capacitors may be formed on separate microwafers with or without active components. For the fabrication of thin film resistors, chromium or materials such as Nichrome or mixtures of chromium or Nichrome and other oxides may be employed.

Figures 2, 3, 4, 5, 6:
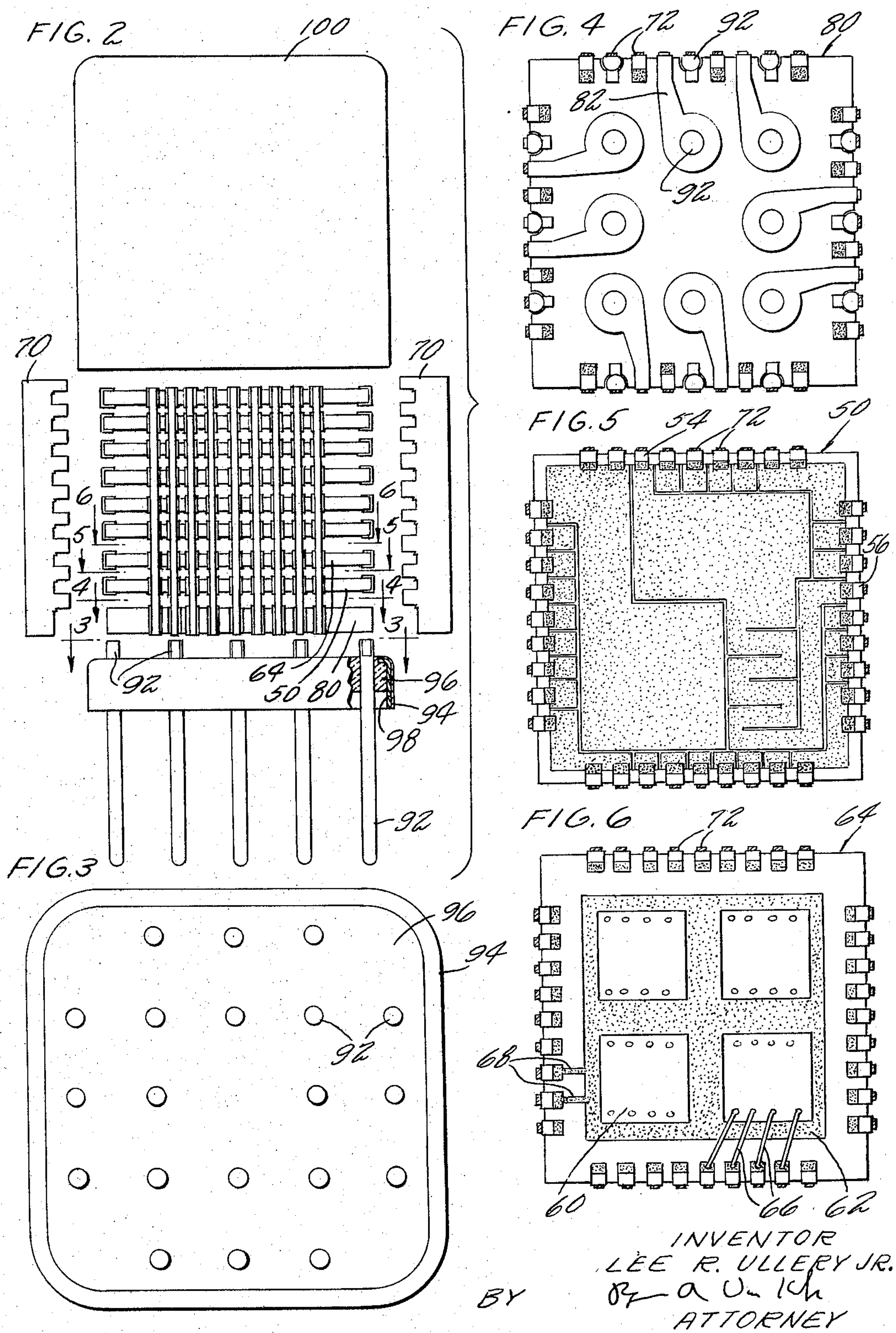
FIGURE 2 is an exploded view of the enhanced micro-module which is the end product of the process shown in FIGURE 1.
FIGURE 3 is a top view of the header assembly of the enhanced micro-module taken along line 3—3 of FIGURE 2.
FIGURE 4 is a top view of the transfer wafer assembly of the enhanced micro-module taken along line 4—4 of FIGURE 2.
FIGURE 5 is a top view of a thin film microwafer used in the enhanced micro-module taken along line 5—5 of FIGURE 2.
FIGURE 6 is a top view of an uncompleted solid state microcircuit wafer use in the enhance micro-module taken along line 6—6 of FIGURE 2.

As is well known in the art, the above mentioned resistive materials may be deposited on the terminated microwafer by vacuum deposition, sputtering pyrolytic reactions, etc. After the resistive material film has been deposited, it is common practice to provide a protective overlay of silicon monoxide, also by vacuum deposition. Chromium and other material thin film resistors are well known in the art and are stable up to 300 to 400° C. with low temperature coefficients. Chromium, for example, can be readily vaporized in a controlled and reproducible fashion with an electron gun heat source and, as will be explained below, is susceptible to electron beam scribing of resistive patterns. If it is desired to form thin film capacitors, alternate layers of a metal and a dielectric material such as aluminum and silicon monoxide are deposited on the terminated microwafer; the aluminum constituting the electrodes of the capacitor and the silicon monoxide forming the dielectric material. Alternatively, a material such as barium titanate may be used as the wafer and metallic electrodes deposited on either side thereof to form a capacitor. The vacuum deposition system used for the production of the chromium films used in the terminations may also be used for the deposition of alternate layers used for capacitors. Deposition systems which will accomplish the foregoing in a quasiautomatic fashion are well known in the art. By use of such systems it is possible to monitor rate of evaporation, period of evaporation, substrate temperature during outgassing, deposition and annealing temperatures, film resistance, residual gas pressure and composition, thickness of the dielectric layer and electrical characteristics of the resistive films. After deposition of the thin films on the terminated wafer, the step 16 of forming the discrete thin film components is performed. That is, it is necessary to isolate and then trim the multilayer films to form discrete thin film capacitors and to form long conductive paths in the chromium or other resistive films to produce the thin film resistors. The foregoing isolation, trimming and forming discrete conductive paths is accomplished by selectively removing portions of the layers of film on the microwafers. The most controllable and thus the preferred method of accomplishing the foregoing is to selectively etch away portions of the layers of chromium, aluminum and silicon monoxide by causing local evaporation thereof with a highly energized beam which may be deflected across the surface of the microcircuit wafer in accordance with a predetermined pattern. While this might be done with a device such as a laser, an intense beam of electrons has been found to be a particularly efficient tool for such purposes. A device capable of producing the necessarily intense electron beam is disclosed in U.S. Patent No. 2,987,610, issued June 6, 1961 to K. H. Steigerwald. The electron beam is a welding or machining tool which has practically no mass but has high kinetic energy because of the extremely high velocity imparted to the electrons. Transfer of this kinetic energy to the lattice electrons of the workpiece generates higher lattice vibrations which cause an increase in the temperature within the impingement area sufficient to accomplish work. Present state of the art electron beam machines of the type shown in the Steigerwald patent, as a result of recently developed refinements in electron optics, can provide a beam focused to produce power densities on the order of ten billion watts per square inch. Such beams may be focused so as to have diameters of less than .0005 inch at the point of impingement on the work. Impingement of such a highly focused, intense electron beam on the surface of a microwafer will etch away portions of the conductive and dielectric films by causing local evaporation thereof. Through programming of the beam deflection by means well known in the art, this process quickly, accurately and automatically forms discrete conductive paths separated by areas in which the conductive material or layers of conductive and insulating material have been selectively removed. These areas thus become insulating regions. Through proper selection of the beam power density; which is a function of the electron accelerating voltage, the number of electrons in the beam, and the beam diameter or spot size; and the speed at which the beam is deflected across the surface of the coated microcircuit wafer, vaporization of the thin films may be caused without damage to the substrate material. That is, the beam power density and deflection rate will control the depth of penetration of the electrons so that they will penetrate only through the layers of insulating and conductive material. A resultant of scribing step 16 is shown in FIGURE 5 which depicts a thin film resistor which has been formed on a terminated ceramic microwafer 50. In FIGURE 5, by scribing a long conductive path in chromium film 52, a thin film resistor has been formed between terminal pads 54 and 56. As should be obvious, the resistance of this thin film resistor may be precisely controlled by controlling the length of the conductive path between the two pads. Similarly, the values of the thin film capacitors may be precisely controlled by trimming the electrode areas with the electron beam.

*Formation of solid state microcircuits*

The terminated microwafers which are not used to form thin film microwafers are used for the fabrication of solid state microcircuit wafers. The first step in the production of these microcircuits consists of the formation of bonding pads on the surfaces of the microwafers. These bonding pads are formed by a metalizing step 18 which provides, in the same manner in which the terminations are provided, a gold-chromium area film on one or both surfaces of the wafers. That is, an area on the surface of the microwafers is metalized, through a picture frame-type mask, with a gold-on-chromium film.

After metalizing, solid state microcircuits are fabricated by an eutectic bonding step 20 through which unencapsulated functional electronic blocks or other pn junction elements are bonded to the gold film on the microwafers surface. While the eutectic technique employed may use a gold-silicon or gold preform of the same size as the functional block, which is placed between the metalized pad on the wafer and the block, an extremely strong bond may be achieved between the active devices and the gold film without use of a preform. To achieve bonding, the structure is heated either locally or throughout to approximately 400 to 450° C. at which temperature bonding occurs since silicon and gold form a eutectic which melts at 370° C. While other techniques for bonding the active devices to the wafers, such as those employing solders, are available, the eutectic technique is most commonly used in view of its reproducibility.

After bonding, it is necessary to interconnect the functional blocks or other pn junction devices and the terminations on the edge of the wafers. Interconnection step 22 may be performed by programmed electron beam welding of leads between terminals on the functional blocks and desired termination pads on the edge of the microwafer. It is also possible to attach leads, which generally are gold, between the terminals and the edge terminations by thermocompression bonding. A solid state microcircuit is shown in FIG. 6 in the final stages of assembly. In FIG. 6, four functional electronic blocks 60 have been bonded to a metalized area 62 on the surface of a microcircuit wafer 64. The terminals on the functional blocks are connected to the edge terminations on the microcircuit wafer by leads 66.

*Formation of microwafer stack*

After completion of the thin film microwafers and the solid state microcircuits, the wafers are stacked in a fixture and maintained in the proper spaced apart relationship by means of stack stabilizers which are slotted to receive the corners of the wafers. The step of stacking the wafers results in the multi-layer structure which can be seen in FIGS. 2 and 7. Both of these figures show how the stack stabilizers 70 maintain the wafers in the proper spatial relation to each other. The stack stabilizers, in the final assembly, also serve the important function of conducting heat away from the microwafers since they are in contact with both the substrate material and the encapsulating can. The stack stabilizers are formed with a burr 71 in each of the slots thereof. These burrs will engage the surface of a wafer if it should try, for example while under vibration, to move out of the slot. The next step 26 consists of the electrical interconnection of the microwafers by means of conductive ribbons. Copper ribbons which typically will have cross-sectional dimensions of .002 x .010 inch are spaced on .025 inch centers so as to match the terminations on the microwafers. This ribbon matrix is then positioned securely against the edge of the microwafer stack so as to place each of the parallel ribbons in contact with an aligned termination pad on each of the microwafers. The microwafer stack is then placed on an adjustable work table, the movements of which may be programmed, in the vacuum chamber of an electron beam machine of the type shown in the above-mentioned Steigerwald patent. Subsequently, welding of the conductor ribbons to the microwafer terminations is carried out incrementally in an automated fashion. That is, after each welding operation along the edge of any one wafer, the work table is stepped .025 inch to the next welding station at which time the electron beam is activated and made to go through a preprogrammed welding cycle. After a row of microwelds has been completed, the table is stepped to bring the next microwafer edge into line with the beam axis. In FIGS. 2 through 7, the copper ribbons are indicated by reference numeral 72. In welding these copper ribbons to the copper or nickel plated chromium-gold terminations, the electron beam accelerating voltage will typically be set at 90 kv. with a beam current of .4 milliamp. With these parameters and a beam diameter of approximately .003 inch, the welding or beam-on time necessary to produce a satisfactory weld is 5.3 microseconds. In this time, $.19 \times 10^{-3}$ watt-sec. are delivered to the weld. To insure a strong bond, during the welding operation the beam is deflected $\pm.0045$ inch normal to the copper ribbon axis at 1100 cycles per second. Thus, an area is scanned of .003 x .009 inch.

*Formation of transfer wafer*

To complete the enhanced micro-module, the wafer stack must be mounted on a base which permits both hermetic encapsulation and plugging the module into an electronic instrument such as a computer. For this purpose there is provided a transfer wafer-header assembly. The step 28 of preparing the transfer wafer consists of the formation of terminations and conductive paths on a notched wafer having a hole array therein. The purpose of the transfer wafer is to permit translation of an interconnection system from that presented by the wafer stack to the .075 inch center-to-center type pin pattern on the hermetic header assembly. The necessity of such a translation can be seen from FIG. 3 which is a top view of the header assembly. Without translation, prohibitively small pins would have to be used on the header assembly due to the close spacing of the ribbon matrix on the edge of the wafer stack. The basic transfer wafer is a notched .020 x .31 x .31 inch ceramic substrate with an eight hole array on the 75 mil grid pattern and with 3 notches along each edge. Such wafers are commercially available.

Referring to FIGURE 4, the step 28 of applying the edge terminations to the transfer wafer is accomplished in the same manner as described above in relation to step 12 wherein the edge terminations are applied to the micro-wafers. From FIGURE 4 it may be seen that the edge terminations are applied on the edge of the transfer wafer 80 both in the notches and along the periphery. However, during the electroplating portion of this step, the notches in the transfer wafers need not be electroplated since the extensions of the copper ribbons on the wafer stack will be welded directly to the pins on the header assembly. Coating of the notches may or may not be necessary depending on the end use of the enhanced micro-module. That is, where the use is to be in an environment subject to extreme vibration, it is necessary to coat the notches which are then brazed to pins on the header assembly by use of a preform thereby increasing structural rigidity. Otherwise, the coating in the notches is not necessary. However, in practice, the notches will always be coated since this permits use of the same masks as used for the formation of the edge terminations on the microwafers. The surface conductors 82 on transfer wafer 80 which provide conductive paths between the hole array and the edge terminations, may be deposited through a mask or obtained by electron beam scribing or photo etching of an area deposited film. In practice, it is generally more desirable to follow an electron beam scribing approach because it is the most flexible. Electron beam scribing of the conductor pattern permits a much wider choice of pin to conductor interconnection. Regardless of which manner of forming the surface conductors is employed, a conductive film must be deposed on the transfer wafer's surface and this conductive material will also coat the inside surface of the holes. It should also be noted that a number of the interconnecting conductors will terminate at isolated pads on the edge of the transfer wafer. It is these conductors that provide the high interconnection capability, absent in the prior art, between devices, circuits and components within the stack.

*Formation of header-transfer wafer assembly*

Once the transfer wafer has been completed, it must be integrated with the header assembly. The side view of the header assembly is shown at 90 in FIGURE 2. As can be seen from FIGURES 2 and 3, the header assembly has 20 pins, extensions of which 92 project above the header assembly. In order to perform the step 30 of assembling the transfer wafer and header, pin extensions 92 must be inserted in the notches and holes provided therefor in the transfer wafer 80. These pin extensions fall short of the top surface of the transfer wafer, thereby forming depressions. An alloy sphere is inserted in each of these depressions and the composite is placed in a brazing fixture. The header and transfer wafer are then brazed together within a hydrogen furnace. Alternatively, the pin extensions may be welded to the coating on the surfaces of the holes with a programmed electron beam. Again, the welding step is preferably accomplished after insertion of an alloy sphere in each depression. After the header assembly has been joined to the transfer wafer, the pin extensions which fit into the notches on the edge of the transfer wafer are ground off, as shown in FIGURE 4, to provide flat surfaces to which the interconnection ribbons on the stack may be welded. The header-transfer wafer assembly provides means for making hermetically sealed electrical connection between the circuitry of the enhanced micro-module and apparatus, such as a computer, into which it may be plugged. The hermeticity of the connections is achieved by the use of the novel header assembly, best seen from FIGURE 2, which comprises a metal outer member 94 which is sealed to a glass inner member 96 by a sealing member 98 which will generally be Kovar. The pins 92, which are Kovar with a nickel-gold coating thereon, pass through glass member 96 and are sealed thereto. The metal outer member 94, usually copper clad with a nickel-gold coating, extends below glass member 96 to thereby cause the glass to stand-off the assembly into which the enhanced micro-module is plugged.

*Final assembly*

The next step in the formation of the enhanced micromodule of this invention consists of the mounting of the microwafer stack on the header-transfer wafer assembly. Mounting step 32 consists of electron beam welding extensions of the copper ribbons on the edges of the microwafer stack to the edge terminations on the transfer wafer and also to the outer pin extensions of the header assembly which extend into the notches in the transfer wafer. This process is basically the same as that described above in connection with the welding of the parallel copper ribbons to the edge terminations of the microwafer stack.

Figure 7:
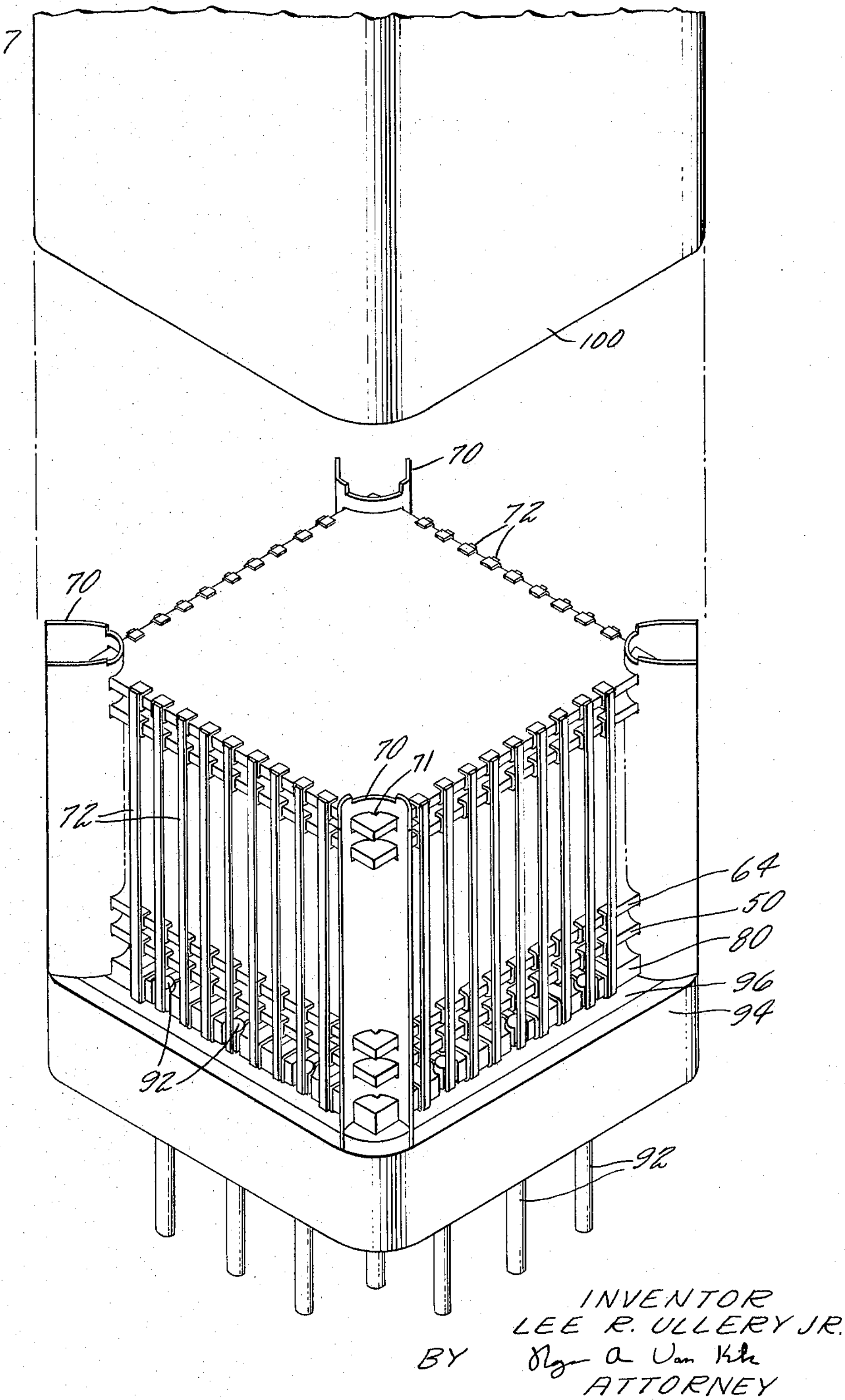
FIGURE 7 is a prespective view of the enhanced micro-module fabricated by the process of FIGURE 1 with the encapsulating can removed.

The final step in the assembly of enhanced micromodule consists of hermetically sealing the microwafer stack. Sealing step 34 comprises vacuum baking the header-stack assemblies composed of semiconductor and/or thin film microcircuits with uncased devices prior to hermetic sealing to minimize the amount of entrapped water vapor. After vacuum baking, the assemblies are passed through a dry box, nickel, copper or steel cans 100 are placed over the microwafer stack, and the complete assembly is transferred into the vacuum chamber of the electron beam machine. Can 100 which is depicted in FIGURES 2 and 7, slides over the stack stabilizers 70 and fits tightly over outer member 94 of the header. In the electron beam machine, the can is welded to the header to produce a sealed unit. As with the electron beam welding of the conductors to the microwafer stack, the sealing operation is an automatic process. Since welding of the can to the header is accomplished in an electron beam welding machine, the end product will ordinarily be hermetically sealed and evacuated. However, if desired, the cans may be provided with a hole in the top thereof. This will permit backfilling with a gas such as helium, very dry nitrogen or a combination of helium and nitrogen. It is often desirable to backfill to provide, as mentioned above, a working environment identical to the testing environment of the individual elements. When backfilling is employed, at least some helium is used so that the enhanced micro-module may be tested, in a mass spectrometer type leak detector, for leaks. Of course, the hole must be welded shut after backfilling. Also, to improve heat transfer away from the microwafers, it is sometimes desirable to weld the can to the stack stabilizers by a blind welding technique, well known in the electron beam welding art, during the final assembly step.

As should now be obvious, the enhanced micro-module of this invention is a device which is compatible with thin film circuitry, thin film integrated hybrid circuits, and silicon integrated circuitry. The apparatus of this invention also may incorporate tubes and passive components not of the thin film type. This invention thus provides a microminiaturized electronic subassembly which permits flexibility in design through wide choice of components and which utilizes interconnection techniques of demonstrated high reliability. Also, the enhanced micromodules are capable of operation in extreme environments due to the fact that the package is hermetically sealed, free of any polymeric materials, and the microwafers utilized have excellent thermal conduction characteristics. Standardization of the parts utilized in the enhanced micro-module, down to the microwafer level, permits the establishment of an automated assembly system with high production rates. While the primary equipment of this system has been described as an electron beam machine which has been complemented with work table and beam deflection programming capabilities, other devices which generate a highly energized beam may be used. For a disclosure of such an automated electron beam machine, reference may be made to made to my copending application Serial Number 274,177 filed April 19, 1963. In addition, the enhanced micro-module offers significant cost advantages and high volumetric efficiency since it utilizes uncased semiconductor circuits and devices. The volumetric efficiency and reliability are both enhanced by the fact that most of the interconnection is accomplished within the module rather than through expensive multi layer printed circuit boards as has been the practice in the prior art.

Other advantages inherent in the enhanced micro-module of this invention are that it provides a large number of interconnecting members without complex and therefore less reliable cross-over or multilayer printed circuit type interconnections. A most important advantage of the present invention is that it is expandable in three dimensions whereas the prior art packages were expandable only in a plane. Also, because of the flexibility of choice of components and the standardization down to the microwafer level, the enhanced micro-module is particularly susceptible to computer organization. Because of the short interconnection paths and the absence of polymeric material, the apparatus of this invention is capable of higher speed operation than prior art packages. High speed operation as well as thermal, vibration and shock protection is further enhanced by the possibility, now presented in modular assemblies by the instant invention of strategically locating components so as to provide protection for or short coupling paths between individual circuits or elements. In the field of protection, use of the enhanced micro-module will provide increased radiation protection for susceptible devices, such as pn junctions, by enabling these devices to be located at the center of the stack. Therefore, radiation would have to pass through several wafers containing thin film devices which are not susceptible to radiation damage before getting to the junction devices. If desired, each enhanced micromodule, because of its extremely high volumetric efficiency, may be redundant. That is, by duplicating all wafers or at least the circuits most susceptible to failure, a modular assembly may be provided that is capable of merely unplugging and reversing in case of failure. Also, redundancy will increase yield since when the device is tested, prior to can welding, defective circuits could be easily cut out.

While a preferred embodiment of this invention has been shown and described, various modifications and substitutions may be made without deviating from the spirit and scope of this invention. Thus, this invention is described by way of illustration rather than limitation and accordingly, it is understood that this invention is to be limited only by the appended claims taken in view of the prior art.

I claim:

1. An electronic microcircuit assembly comprising:
   a plurality of microcircuit wafers for supporting active and passive components,
   said wafers having corner portions and being stacked in mutually spaced relationship and substantially parallel to each other and having corresponding edges and corner portions arranged in alignment,
   a plurality of thin channel-shaped stack supporting members each having a plurality of slots oriented substantially transverse to and selectively spaced along the channel,
   said stack supporting members connected to the stack of wafers with the corner portion of each of the wafers inserted into one of said slots and protruding through said channel.

2. A device as recited in claim 1 where the stack supporting member is further provided with a burr extending the slots to frictionally engage said protruding wafer corner portions.

3. An electronic microcircuit assembly comprising:
   a plurality of microcircuit wafers for supporting active and passive components,
   said wafers being stacked in mutually spaced relationship substantially parallel to each other and having corresponding edges arranged in alignment,
   a stack supporting member having a plurality of slots and connected to the stack of wafers with portions of an edge of each of the stacked wafers protruding into one of said slots, a header with a plurality of pins extending above and below the header, said header being stacked substantially parallel and in alignment with the stacked wafers, where at least one aligned edge of each of said stacked wafers is provided with a plurality of conductive termination pads with each of said pads being wrapped about said one edge with a portion extending on one wafer surface and a portion extending on the opposite wafer surface, a plurality of conductors electrically interconnecting preselected aligned edge portions of termination pads of several of the wafers, where the wafer adjacent the header is a transfer wafer provided with a plurality of conductively coated holes in alignment and in electrical contact with the header pins extending above the header, and where said transfer wafer is further provided with means for selectively electrically interconnecting several of the surface portions of the termination pads with said conductively coated holes.

4. A device as recited in claim 3 wherein said transfer wafer is further provided with a plurality of conductively coated notches along said one edge and in alignment with several of the conductors, and where several of the header pins extending above the header are in alignment and in electrical contact with the conductively coated notches.

5. A device as recited in claim 3 where the header further includes:

an insulator member substantially transverse to the header pins for supporting the header pins, where said insulator member has a surface area larger than the cross sectional area of the stacked wafers with the attached conductors, means for providing the edge of the insulator member with a metal outer member, and an encapsulating can attached to the metal outer member and hermetically enclosing the stacked wafers, the stack supporting members and the metal outer member.

6. A device as recited in claim 5 where the encapsulating can conducts heat and is in heat conducting relationship with the stack supporting member.

7. A device as recited in claim where the metal outer member has an edge extending over the insulator member below the header.

8. An electronic microcircuit assembly comprising:

a plurality of microcircuit wafers for supporting active and passive components, said wafers being stacked in mutually spaced relationship substantially parallel to each other and having corresponding edges arranged in alignment, a stack supporting member having a plurality of slots and connected to the stack of wafers with portions of an edge of each of the stacked wafers protruding into one of said slots, a plurality of electrically conductive terminal pads attached to said wafers, where each of said pads continuously extends over a small area on the surface of the wafer and a small area on an edge of the wafer, where the active and passive components include thin film components deposited on some of the wafer surfaces and electronic devices attached to other wafer surfaces, means for electrically connecting preselected electronic devices and thin film components to the wafer surface portions of said terminal pads, and a plurality of substantially parallel conductors electrically interconnecting preselected wafer edge portions of said terminal pads.

References Cited by the Examiner

UNITED STATES PATENTS

| | | | |
|---|---|---|---|
| 2,951,185 | 8/1930 | Buck | 317—101 |
| 2,771,663 | 11/1956 | Henry | 317—101 X |
| 2,832,013 | 4/1958 | Pedersen | 317—101 |
| 2,909,289 | 10/1959 | Laurie | 108—153 |
| 2,995,351 | 10/1960 | McCreadie | 29—155.5 |
| 2,995,686 | 8/1961 | Selvin | 317—101 |
| 3,029,495 | 4/1962 | Doctor | 317—101 |
| 3,052,957 | 9/1962 | Swanson | 29—155.5 |
| 3,134,049 | 5/1964 | Kilby | 317—101 |
| 3,148,310 | 9/1964 | Feldman | 317—101 |
| 3,184,648 | 8/1965 | Brown et al. | 317—101 |

ROBERT S. MACON, *Acting Primary Examiner.*

LARAMIE E. ASKIN, KATHLEEN H. CLAFFY, *Examiners.*

S. H. BOYER, J. J. BOSCO, *Assistant Examiners.*